United States Patent [19]
Morlon

[11] 3,731,499
[45] May 8, 1973

[54] FLEXIBLE COUPLINGS

[75] Inventor: Jean Morlon, Bourg-La-Reine, France

[73] Assignee: Paulstra, Levallois-Perret, France

[22] Filed: July 12, 1971

[21] Appl. No.: 161,538

[30] Foreign Application Priority Data

Aug. 5, 1970 France..............................7028949

[52] U.S. Cl......................................64/11 R, 64/13
[51] Int. Cl..............................................F16d 3/00
[58] Field of Search........................64/11 R, 13, 10

[56] References Cited

UNITED STATES PATENTS 3,470,710 10/1969 Feller et al. ........................64/11
2,982,118 5/1961 Franceschetti et al. ...................64/13
3,470,602 10/1969 Vossieck ..................................64/11
2,998,717 9/1961 Schwenk ..................................64/13

*Primary Examiner*—Kenneth W. Sprague
*Attorney*—Larson, Taylor and Hinds

[57] ABSTRACT

The couplings are for interposing between two shafts and comprise essentially an elastically deformable block positioned between bushes rigidly fixed to the shafts. The elastic unit includes rubber cushions adhered to a plurality of radial reinforcing elements some of which are fixed together in the form of a star while the others are radially movable or floating. This unit is mounted with precompression inside a drum rigidly fixed to stiffening arms. The coupling is especially useful for vehicle engines.

19 Claims, 5 Drawing Figures

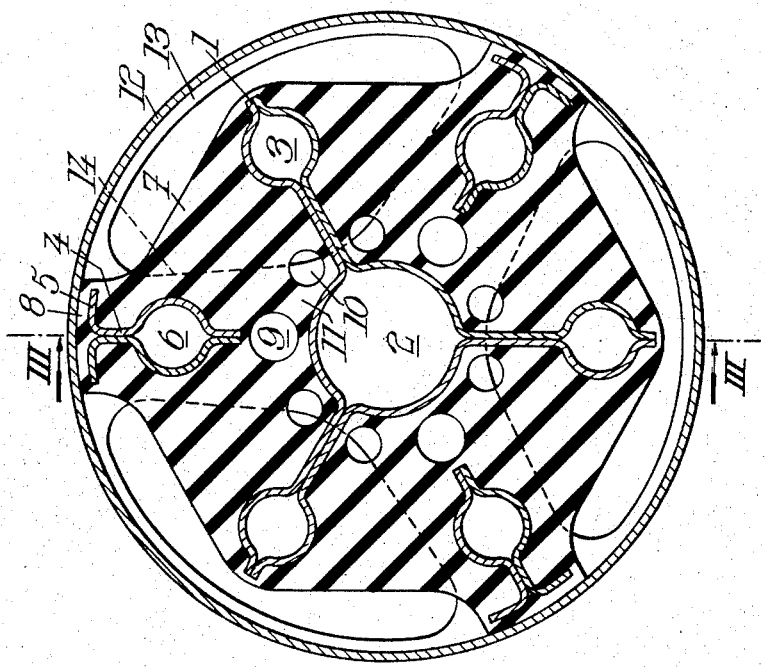
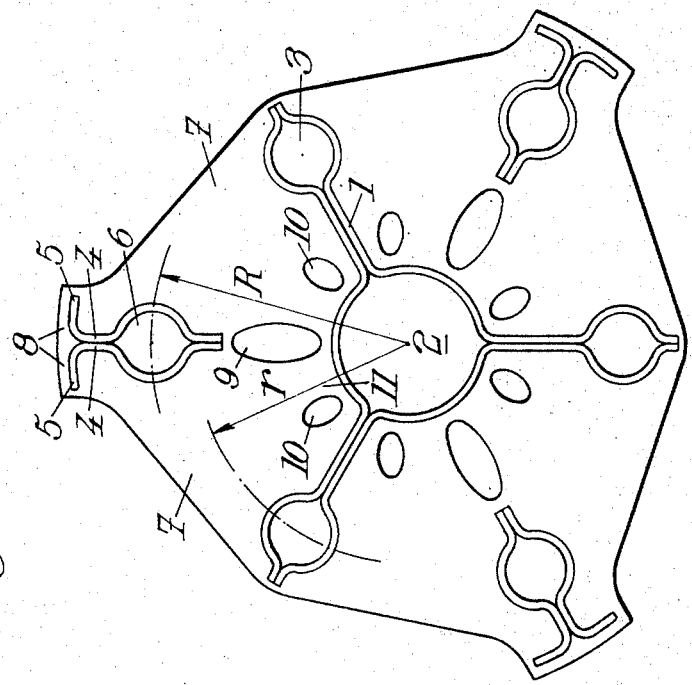

Patented May 8, 1973

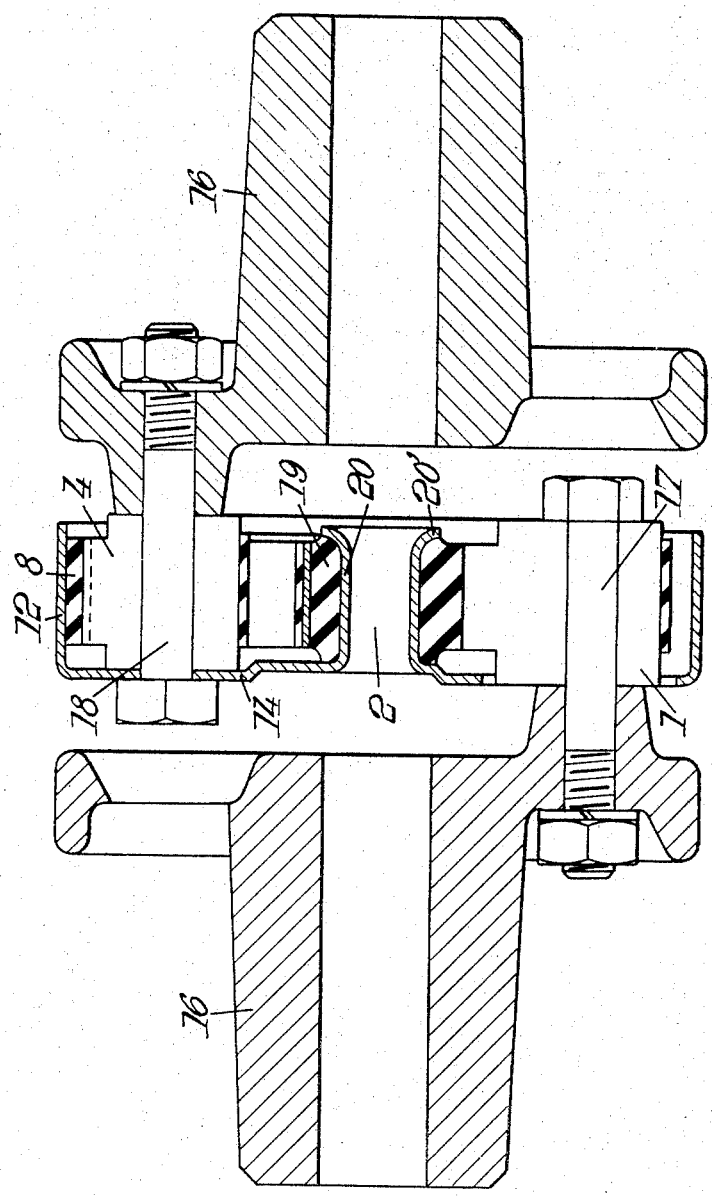

FLEXIBLE COUPLINGS

The invention relates to flexible couplings for positioning between two shafts or stub shafts, these couplings being essentially constituted by at least one elastic deformable unit, interposed between bushes or plates rigidly fixed to the said shafts and comprising rubber cushions distributed around the axis and urged into deformation under the effect of applied torque.

It is known to produce such units by means of arms or cushions of rubber connecting in pairs, metallic reinforcing elements of even number serving to fix the flexible unit alternately to the driving bush and to the driven bush.

It is also known to precompress the arms or cushions of rubber so as to ensure greater strength and longer life of the elastomer, having regard to the dynamic forces resulting from the torque transmitted through the coupling. This precompression is at present effected by means of a band which surrounds, gripping it, the elastic unit, which band is removed after assembly, the precompression force being then maintained by the fixing bolts.

The removal of this band is often difficult. In addition, to dismount the coupling (with a view to replacement for example) it is necessary to rebind it by means of a screw clamping collar, which is tightened until it is possible to withdraw the bolts.

It is an object of the present invention, among other objects and advantages which will be described below, to replace the band by permanent precompression means, acting independently of the bolts and enabling simple and rapid mounting and dismounting.

The invention consists principally, in including, in couplings of the type concerned, at least one flexible unit arranged in the form of rubber cushions (and preferably molded in a single part) adhered to a plurality of substantially radial reinforcing elements certain of which are fixed together, in the form of a star, whilst others are movable, that is to say floating, radially so as to permit prestressing to be exerted on the rubber, the whole being mounted, with prestressing, inside a rigid support, especially a drum.

The support or drum comprises a stiffening flange or, at least, radial arms arranged in line with the above-mentioned movable radial reinforcing elements, so as to box in the prestressing forces.

The above-mentioned reinforcing elements, as well as the said arms rigidly fixed to the drum, are advantageously provided with cylindrical passages intended to be traversed by two groups of bolts adapted to ensure, according to an arrangement known in itself, the respective connexions between the unit and the two bushes rigidly fixed to the shafts. It will then be noted that the centrifugal force exerted at high speeds on the said bolts is balanced by the presence, on one hand, for a group of bolts, of the said radial arms or other elements rigidly fixed to the drum, and, on the other hand, for the other group of bolts, of the radial reinforcing elements fixed in a star, especially forming a unit with a central ring.

The rubbery material of the units is advantageously provided, on molding, with suitable cavities, intended to increase the deformability on prestressing.

In another preferred embodiment, the abovementioned support or drum is centered on the assembly of radial reinforcing elements fixed in a star, the stiffening arms of the said drum comprising for example a tubular extension penetrating into the central ring rigidly fixed to the said reinforcing elements, with the incorporation, between these two elements, of a flexible bush.

The invention comprises, apart from these various features, certain other features which are preferably used at the same time and which will be more explicitely considered below.

The invention includes, more particularly, certain methods of application (especially to couplings for vehicle engines) as well as certain methods of production, of the said features; and it relates, again more particularly, and this by way of new industrial products, to couplings of the type concerned including the application of these same features, as well as the special elements adapted for their construction and the assemblies, especially engines and vehicles, comprising such couplings.

In order that the invention may be more fully understood, several preferred embodiments of flexible couplings according to the invention are described below purely by way of illustrative and non-limiting example, with reference to the accompanying drawings, in which:

FIG. 1 shows, in elevation, a flexible disc according to the invention, for a flexible coupling, this disc being shown after molding and before precompression;

FIGS. 2 to 4 show respectively in transverse section along the line II—II, of FIG. 3, in axial section along the line III—III, of FIG. 2, and in side view, a flexible coupling comprising a disc of the type of that of FIG. 1 and intended to be interposed between two shafts; and FIG. 5 shows, with a variation, the assembly of such a coupling and of the bushes between which it is mounted.

Figure 4:
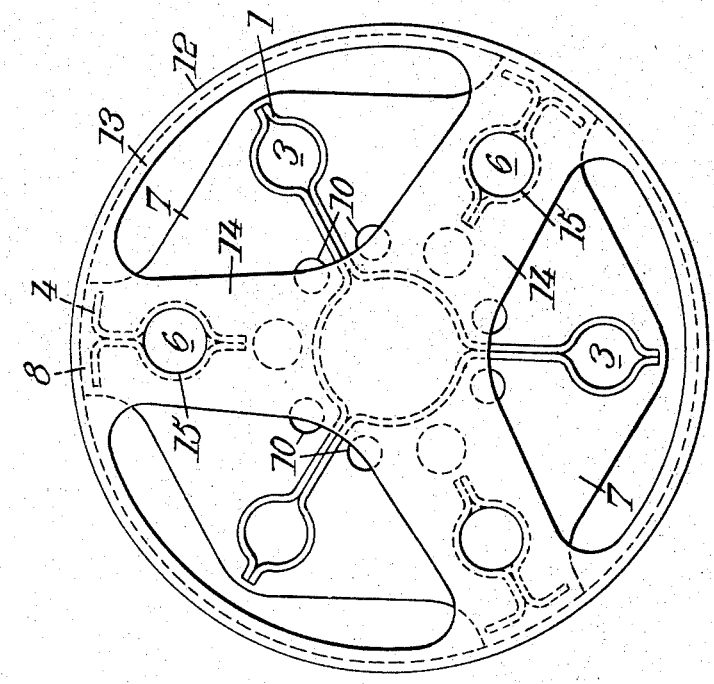

According to the invention, and more specially according to those of its methods of application, as well as according to those of the methods of production, of its various parts, to which it appears that preference should be given, in order to construct, for example between two bushes or plates such as 16 (FIG. 5), a flexible coupling with rubber cushions supported on reinforcing elements, procedure is as follows or in analogous manner.

This coupling comprises, as is shown in FIG. 1, a flexible disc, in which the various cushions that it comprises are preferably arranged in a single unit from molding with a certain number of radial reinforcing elements. FIG. 1 shows this annular unit as it emerges from the mold used to obtain the vulcanization of the rubber (or similar elastomer) and its adherence to the said reinforcing elements.

These reinforcing elements are of two types, being especially distributed in two groups of three, namely:

a first group of reinforcing elements 1 at 120°, fixed between themselves to the center, to form a star;

a second group, also at 120°, intercalated in the first, the reinforcing elements 4 of this second group being radially movable.

The first group is constituted for example by three stamped elements of sheet metal 1 so as to constitute, after welding to one another, a sort of star with three arms, providing at its center a cylindrical opening 2 and at the ends of the arms cylindrical passages 3 for the bolts which will serve for fixing to one of the bushes 16 (FIG. 5). The axis of these three cylindrical passages are situated at the same fixed distance r from the axis of the coupling.

The second group comprises three other reinforcing elements called "floating" in the sense that, on one hand, they are not rigidly fixed to the star shaped central reinforcing element and that, on the other hand, they are not rigidly fixed between themselves. Each is constituted by two symmetrical sheet metal elements 4, coupled and welded, curved and bent in such a way that the reinforcing element has a tubular passage 6 for a fixing bolt, and, at its outer end, preferably to squarely flanged edges 5.

The reinforcing elements 1 and 4 thus constituted are connected by blocks or cushions of rubber 7 adhering to the metal and which cover them completely, as shown in FIG. 1. The edges 5 are also covered with a thin thickness (1 to 3 cm) of rubber 8.

In the blocks of rubber are arranged cavities 9 and 10 which, on one hand, increase their flexibility and reduce the localizations of fatigue and, on the other hand, facilitate the placing under compression of the blocks, as will be indicated below.

These cavities leave betwen themselves "feet" of rubber 11 which, adhered to the sheet metal ring 2, contribute to resisting the outward deformation of the rubber arms 7 under the effect of centrifugal force at high rotary speeds. It is for this reason that it is advantageous to make it in such a way that there is provided a cavity 9 preferably elongated along each reinforcing element 4 and two generally smaller cavities 10, on each side of the axis of each reinforcing element 1, this in place of the single large cavity such as is generally provided.

The assembly is constructed so that, on molding, the axis of the three tubular passages 6 of the floating reinforcing elements 4 are situated, with respect to the axis of the unit, at a distance R greater than r (FIG. 1).

In combination with this unit there is provided an outer support, especially an outer drum, into which the said block is introduced by force, that is to say by exerting a centripetal radial pressure on the floating reinforcing elements 4.

Figure 3:
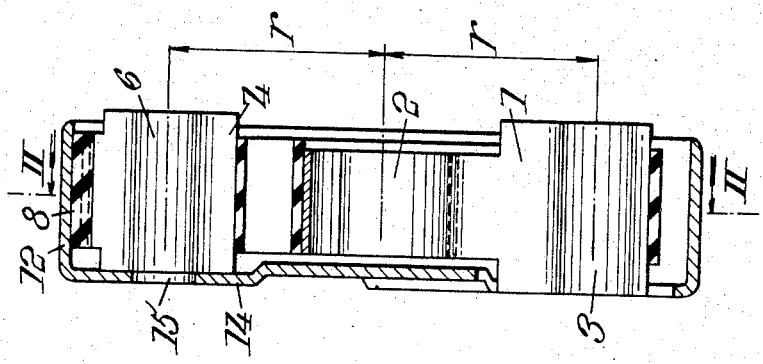

FIGS. 2, 3 and 4 show the flexible unit ready to be mounted on the coupling.

Said drum is made preferably of stamped sheet metal comprising a perforated end plate having, on one hand, a folded edge 13, which gives peripheral rigidity to the drum and, on the other hand three arms 14 each pierced with a hole 15 at a distance r from the center. The inner diameter of the drum 12 is of such dimensions and the fitting is effected in such a manner, that the radius R is brought to the value r and that the holes 15 occur opposite the holes 6 of the reinforcing elements 4. As a result of the operation, by a wedging action, the blocks of rubber 7 are compressed through the flexible supports 8. It cannot deform the drum due to the fact of the retention exerted by the sheet metal arms 14.

The presence of flat edges 5, with a layer of rubber 8, holds the reinforcing elements 4 in their radial position and prevents them if necessary from turning under the effect of the twisting or clamping torque of the bolts.

The flexible block thus constituted comprises therefore six fixing holes, obviously of the same diameter, situated on a same fixing radius r.

On mounting, the assembly presents itself in the manner illustrated on FIG. 5, in the case where the bushes 16 are identical.

The three rigidly connected reinforcing elements 1 are bolted to the flange of one of the bushes 16 by three bolts 17 and the three reinforcing elements 4 are bolted to the flange of the other bush 16 by bolts 18.

It is recommended to effect the mounting in such a way that the bottom of the drum is not applied against the bush to which it is fixed, but placed on the other side, as shown in FIG. 5, so that the sheet metal arm 14 contributes to supporting the centrifugal force applied to the bolts 18 and to the reinforcing elements 4, which centrifugal force, at high speeds and without precaution, would subject the bolts to considerable flexional stresses to the right of their anchorage in the bush.

It should be noted that the three other bolts 17 are protected against the centrifugal force by the retention of the star-shaped arms of the three rigidly connected reinforcing elements 1.

As a result this type of flexible disc has characteristics, both as regards the rubber and its mechanical structures, suited to ensuring good behavior with regard to centrifugal force, enabling it consequently to rotate at high speeds.

There is also shown, in FIG. 5, a variation in which there are provided means for centering the drum 12, 13, 14 with respect to he ring or central opening 2 of the fixed star-shaped reinforcing elements 1.

To this end, for example, the lower portion of the cylindrical ring 2, formed by the reinforcing elements 1, is covered by an adhered ring of rubber 19.

The bottom of the drum, in the portion where the arms 14 join it, comprises a tubular extension 20 in the axis.

At the moment of positioning the disc in the drum, this tube is driven in slightly hard inside the rubber ring 19. There can then be effected, as shown at 20', a flaring of the end of the tube, so as to emprison and compress the rubber 19 effectively.

The centering of the reinforcing elements 4 with respect to the reinforcing elements 1 is thus ensured and, consequently, the centering of the two bushes 16, with respect to one another, independently of the radial elasticity of the disc.

This device has much advantage in the case of the mounting called a cardan shaft : two couplings, such as that shown in FIG. 5, are mounted at the ends of a same shaft not supported by bearings ; the two ends of the shaft thus are centered, which enables it to rotate at substantial speeds without any other special precaution.

A ball joint can also be provided inside the tubular extension 20, said ball joint being borne by the corresponding bush 16.

As result of which, whatever the embodiment adopted, couplings may be constructed whose operation emerges sufficiently from the foregoing for it to be unnecessary to dwell further on the subject, and which have, with respect to previously existing couplings of the type concerned, numerous advantages, especially :

that of enabling the production of a precompression as high as desired, that of ensuring a well-determined value for this precompression, that of ensuring easy mounting and dismounting, that of enabling the centrifugal force to be balanced, both on the flexible masses and on the fixing bolts, and that of lending itself to a simple and inexpensive construction, the preparation of the elastic unit being effected in a single molding operation.

As is self-evident, and as emerges already from the foregoing, the invention is in no way limited to those of its methods of application, nor to those of its methods of production of its various parts, which have been more especially considered ; it encompasses, on the contrary, all variations, especially those for which the support ensuring the maintenance of the precompression would have any other form than that shown.

I claim

1. Flexible coupling, particularly for positioning between two bushes or plates rigidly fixed to two shafts or other rotary elements to be driven one by the other, said coupling comprising an inner assembly of at least one flexible unit arranged in the form of elastomeric cushions, a plurality of substantially radial reinforcing elements to which said cushions are adhered, some of said reinforcing elements being fixed together in the form of a star, whilst others are movable radially, to enable prestressing to be applied to the cushions, and a rigid outer support including at least one stiffening element having means for coupling to a said bush, said inner assembly being prestressed by radial compression of said floating elements and retention inside said outer support.

2. Coupling according to claim 1, wherein said unit is molded in a single part with its rubber cushions and its reinforcing elements.

3. Coupling according to claim 1, wherein the radial reinforcing elements fixed together in the form of a star are constituted by strips of sheet metal welded together and forming a central ring-shaped opening.

4. Coupling according to claim 1, wherein the movable reinforcing elements are constituted by welded pairs of strips of sheet metal, outwardly curved to constitute two feet adapted to come into contact, after prestressing, with the inner surface of the outer support.

5. Coupling according to claim 4, wherein the contact of the said feet with the outer support is effected with the interposition of a layer of elastomer.

6. Coupling according to claim 1, wherein the reinforcing elements comprise openings for the passage of bolts for fixing the respective elements of the flexible units to the two bushes or plates to be coaled.

7. Coupling according to claim 1, wherein the distance with respect to the axis, of the openings provided in the radially movable reinforcing elements, is greater than the corresponding distance of the reinforcing elements fixed between them, to enable, by deformation, prestressing on assembly.

8. Coupling according to claim 1, wherein the radially movable reinforcing elements have a central portion on which the elastomer adheres, and in order to facilitate the deformation of the elastomer on precompression, a number of cavities are provided in its mass.

9. Coupling according to claim 8, wherein there are provided, on one hand, radially elongated cavities, along the radii of the radially movable reinforcing elements, and, on the other hand, small cavities on each side of the star-shaped reinforcing elements, so as to leave, between these two groups of cavities, sufficiently wide feet through which the elastomer adheres on the central portion of the star.

10. Coupling according to claim 1, wherein the outer support is constituted by an open drum, hence with a cylindrical outer surface, and said stiffening arms are radial.

11. Coupling according to claim 10, with radial reinforcing elements provided with openings for the passage of fixing bolts, wherein the radial portion of the drum forms a stiffening element and is constituted by arms arranged in line with the radially movable reinforcing elements.

12. Coupling according to claim 11, wherein between said arms the cylindrical edge of the drum comprises a stiffening edge.

13. Coupling according to claim 11, wherein the flexible unit is mounted in such a manner that, considering the fixing by bolts of the arms of the drum as well as of the corresponding reinforcing elements on one of the two bushes to be coupled, the arms are presented outwardly with respect to the corresponding support surface on the said bush, so that the arms act freely to resist the effect of centrifugal force on the bolts.

14. Coupling according to claim 1, wherein means are provided to center the outer support with respect to the assembly of fixed radial reinforcing elements.

15. Coupling according to claim 14, wherein the stiffening portion of the outer support comprises an axial extension adapted to penetrate into the central annular portion of the star-shaped reinforcing elements, with the interposition of a rubber bush.

16. Flexible couplings according to claim 1, wherein said support is a drum.

17. Flexible couplings according to claim 1, wherein said reinforcing elements are constituted by welded strips of sheet metal.

18. Flexible couplings according to claim 1, consisting of two groups of three reinforcing elements.

19. Flexible couplings according to claim 1, wherein said central portion is of cylindrical contour.

* * * * *